Jan. 30, 1968 C. C. GREEN 3,366,723
METHOD FOR FORMING A LINER ON A CLOSURE
Filed July 24, 1964 4 Sheets-Sheet 1
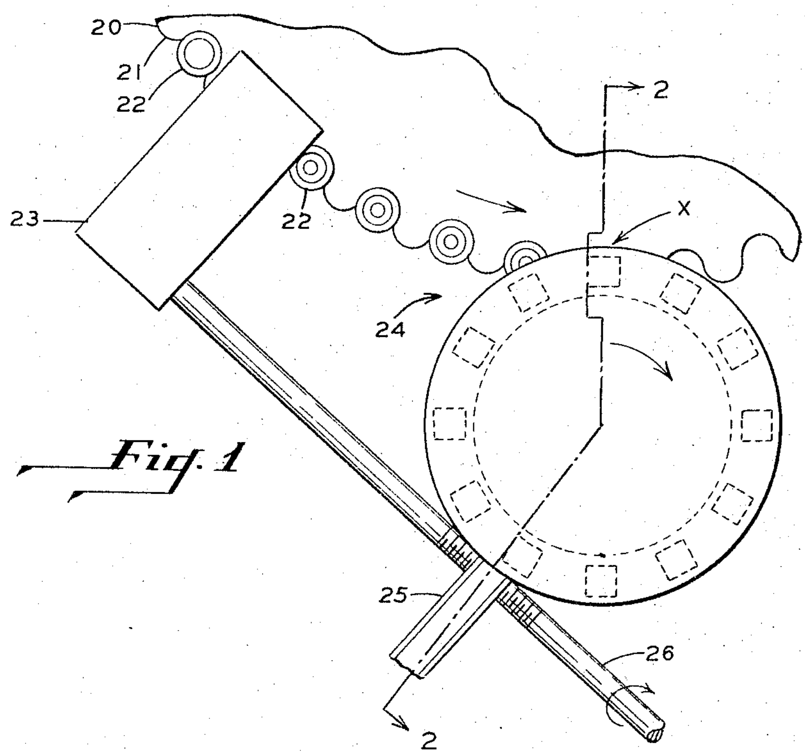
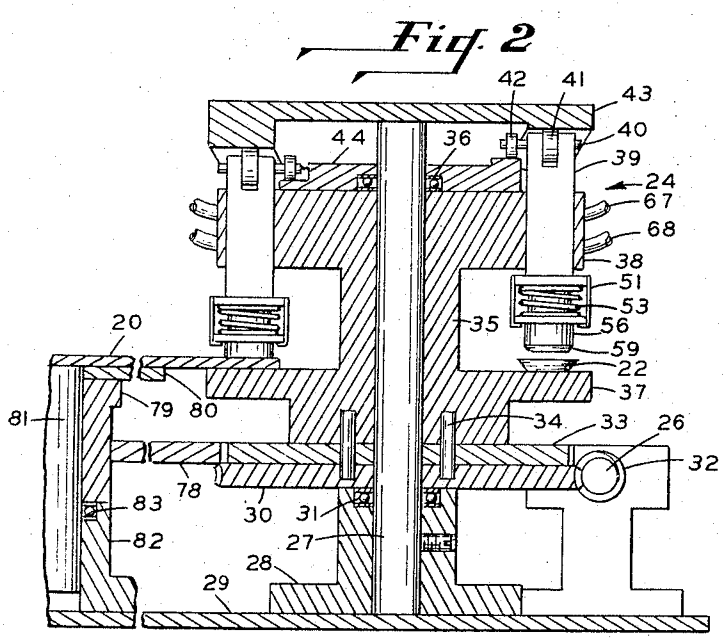
INVENTOR
CLARENCE C. GREEN
BY Stephen S. Kusting
ATTORNEY METHOD FOR FORMING A LINER ON A CLOSURE
Filed July 24, 1964 4 Sheets-Sheet 2
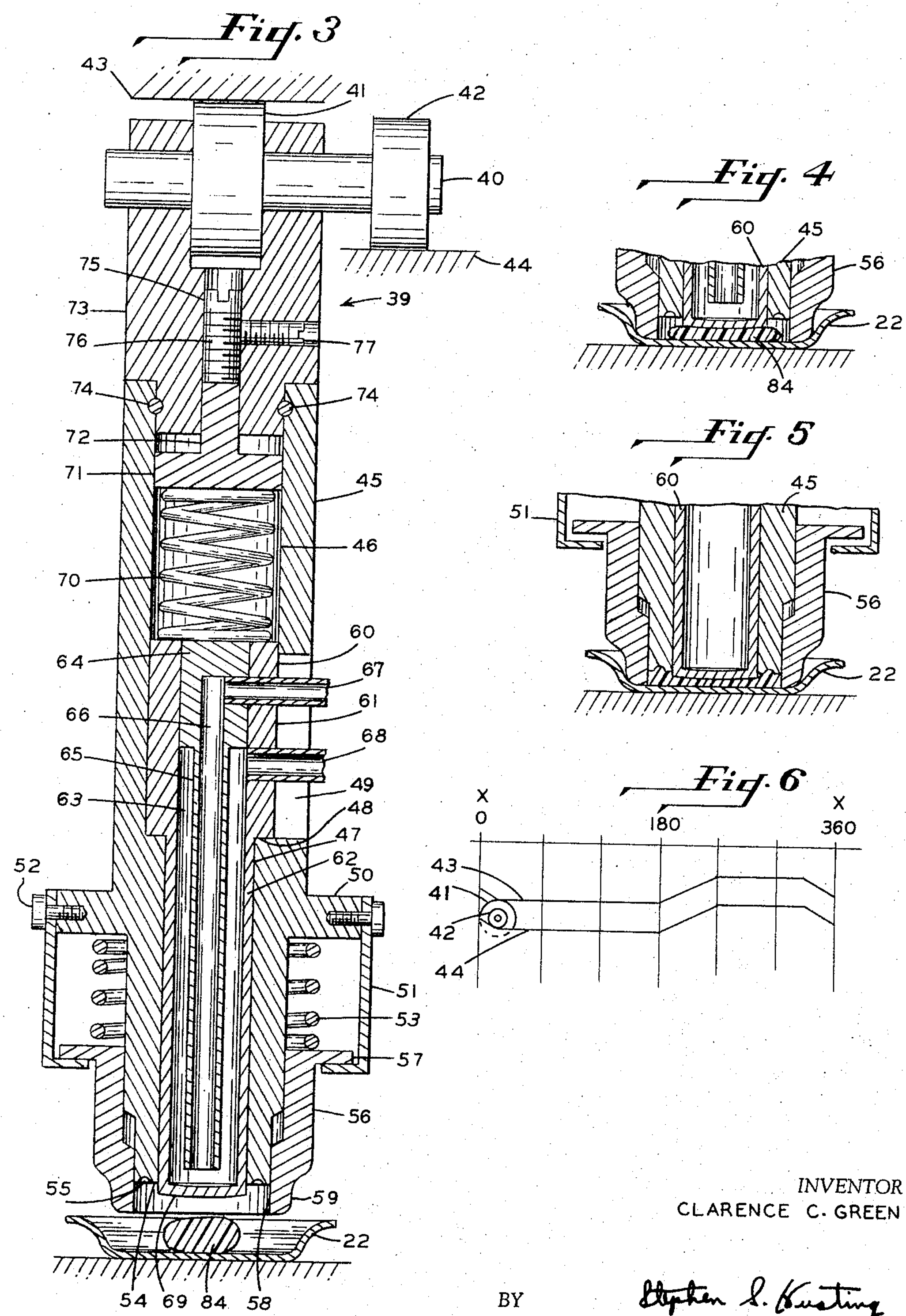
INVENTOR
CLARENCE C. GREEN
BY Stephen S. Kuesting
ATTORNEY METHOD FOR FORMING A LINER ON A CLOSURE
Filed July 24, 1964
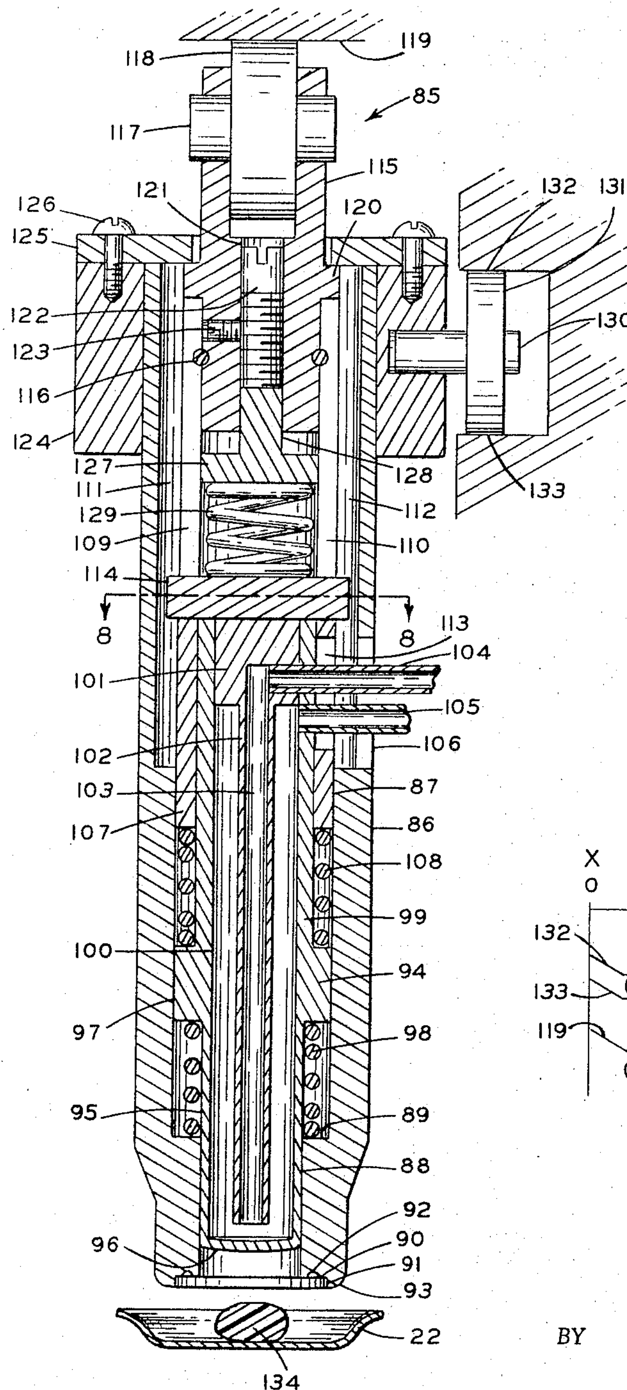
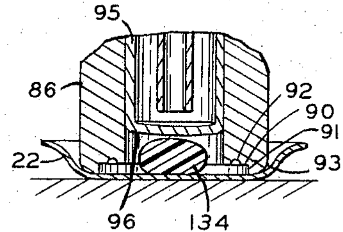
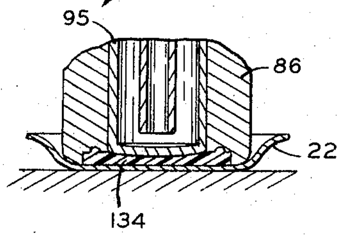
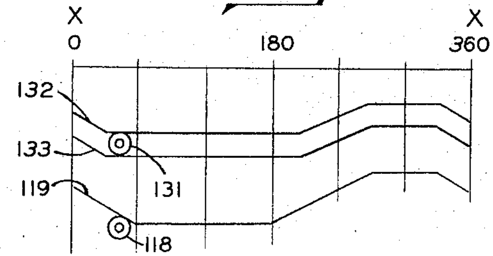
INVENTOR
CLARENCE C. GREEN
BY Stephen S. Kusting
ATTORNEY METHOD FOR FORMING A LINER ON A CLOSURE
Filed July 24, 1964 4 Sheets-Sheet 4
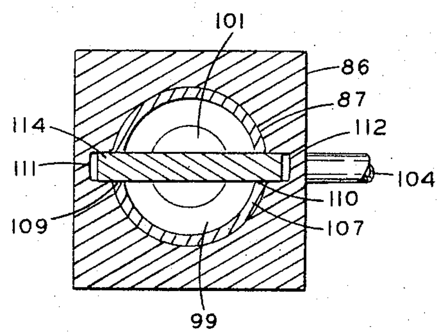
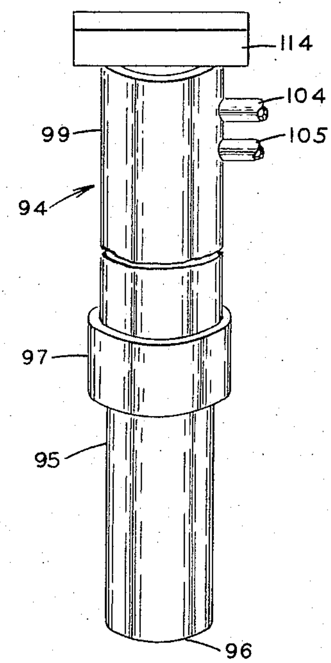
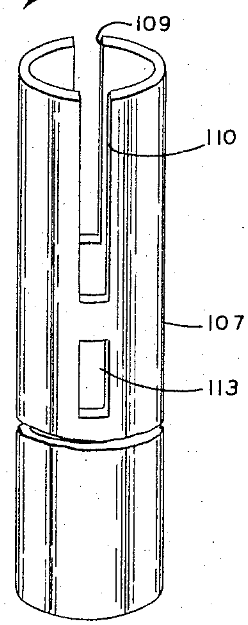
INVENTOR
CLARENCE C. GREEN
BY Stephen S. Kusting
ATTORNEY United States Patent Office 3,366,723
Patented Jan. 30, 1968

3,366,723
METHOD FOR FORMING A LINER ON A CLOSURE

Clarence C. Green, Manheim Township, Lancaster, County, Pa., assignor to Armstrong Cork Company, Lancaster, Pa., a corporation of Pennsylvania
Filed July 24, 1964, Ser. No. 385,012
1 Claim. (Cl. 264—268)

ABSTRACT OF THE DISCLOSURE

Method for forming a liner on a closure and more particularly the improved molding plunger for molding a liner on a closure. The method contemplates the accumulating of excess liner material near the center portion of the closure liner. The apparatus accomplishes this method by having a resiliently biased center portion of the molding head move upward in the center region of the liner to accommodate excess liner material. This assures that the liner ring will always be of the same predetermined height and excess material is accumulated in the center region of the liner.

U.S. Patent 3,135,019, issued June 2, 1954, discloses a machine for applying sealing liners to closures. This machine comprises a rotary molding turret having a plurality of circumferentially spaced, upright molding plungers reciprocatingly mounted thereon. Underlying the plungers in spaced relationship thereto is an annular, anvil flange. Closures to be lined are supplied to the anvil flange and have unformed liner material thereon. Each molding plunger is caused to successively engage one of the closures on the anvil by suitable cam actuating means. Each plunger forces the liner material in the engaged closure to conform to the shape of its lower surface, thereby molding a liner on each closure. Each molding plunger comprises a substantially rigid, central portion and a pair of resiliently supported, concentric, sleeve rings therearound. The outer ring is the first element of the plunger to engage a closure. This outer ring performs a closure-centering and liner-limiting function by purportedly defining the outer limits to which the formable liner material may be flowed. The inner ring is positioned so that its lower portion is about that of either the rigid, central portion or the outer ring to allow the formable liner material to form a sealing ring on the finished liner. The resilient support arrangement for the inner ring allows any excess liner material to flow against and raise it against its associated spring. In this case it will be apparent that the distance which said inner ring may be raised depends upon the amount and position of the excess of liner material. As the amount and position of liner material deposited in each closure will vary, so will the amount of excess and, consequently, the height of the sealing ring vary. Variation in the height of the sealing ring on the liner of a single closure and variation in the heights of sealing rings on the liners in a group of closures of the same type are highly undesirable as uniformity of sealing ring height on each closure and between all closures of the same type is necessary to assure proper sealing relationships between said closures and containers to which they may be applied. Improper sealing relationships between closures and containers may result in leakage and spoilage of the goods stored therein.

The outer ring is also resiliently supported. Should the outer member be raised from its engagement with periphery of the closure being lined by an excess of liner material, said liner material is free to flow over the surface of the closure in an unconfined manner. Such unconfined flow produces undesirable flashing and uneven liners on closures. Such defective closures usually are not marketable since they may not adequately seal the container to which they are applied.

In order to overcome these difficulties, the method and apparatus of the present invention provide a molding operation wherein any possible excess liner material is taken up in or allowed to accumulate in the center portion of the closure rather than in the sealing ring or outer portion thereof.

An object of the present invention is to provide method for forming liners on closures.

Another object of the present invention is to provide method for forming a liner on a closure wherein any possible excess liner material may be absorbed or accumulated in the central portion of said closure.

Other objects of the present invention will be apparent from the detailed description thereof with reference to the drawings wherein:

FIGURE 1 is a partial plan view of apparatus for forming liners on closures;

FIGURE 2 is a sectional view of the apparatus shown in FIGURE 1 taken along line 2—2 therein;

FIGURE 3 is a sectional view in elevation of a molding plunger used in the apparatus in FIGURES 1 and 2;

FIGURE 4 is a partial view in section of the molding end of a molding plunger similar to that shown in FIGURE 3 when said molding plunger is in a preliminary liner-forming position;

FIGURE 5 is a partial view in section of a molding plunger similar to that shown in FIGURE 3 wherein said plunger is in the final liner-forming position in a closure;

FIGURE 6 is a diagrammatic view of the cam surfaces which actuate the molding plungers of the apparatus shown in FIGURES 1 and 2;

FIGURE 7 is a sectional view in elevation of a modified form of molding plunger according to the present invention;

FIGURE 8 is a sectional view of the molding plunger shown in FIGURE 7 taken along line 8—8 thereof;

FIGURE 9 is a view in elevation of the punch portion of the molding plunger shown in FIGURE 8;

FIGURE 10 is a view in elevation of the sleeve portion of the molding plunger shown in FIGURE 8;

FIGURE 11 is a partial view in elevation of a molding plunger similar to that shown in FIGURE 7 wherein said plunger is in a preliminary liner-forming position with respect to a closure;

FIGURE 12 is a partial view in section of a molding plunger similar to that shown in FIGURE 7 wherein said molding plunger is in final liner-forming position with respect to a closure; and FIGURE 13 is a diagrammatic view showing cam surfaces which may be used to actuate molding plungers of the type shown in FIGURES 7 to 9.

Referring now to FIGURE 1, there is shown a rotatable carrier 20 having a plurality of spaced, circular segments 21 projecting outwardly along the periphery thereof. The spaces between segments 21 are such that they may carry closures 22 which are to be lined. Carrier 20 rotates in the direction of the arrow and carries closures to be lined through a liner material metering and distributing apparatus 23, at which point a predetermined amount of liner material is deposited on each of the closures 22. Closures 22 are then carried by carrier 20 to liner-forming turret 24. Turret 24 has a plurality of peripherally spaced, upright, liner molding plungers reciprocatingly and rotatably mounted thereon. At the point indicated by arrow X in FIGURE 1, one of the molding plungers will overlie one of the closures 22 on carrier 20 and will be caused to engage that closure. This engagement causes transfer of the closure 22 from carrier 20 to turret 24 around which the molding plunger and engaged closure 22 are rotated. During this time the lower portion of the molding plunger has engaged the liner material and has compressed it in a manner to form a liner on the closure with which it is engaged. After traveling about 180° from point X, the molding plunger will be disengaged from the closure 22. Said closure will be rotated to discharge chute 25 at which point said closure will be transferred to discharge chute 25 by suitable guide means. The now-lined closures 22 may be suitably collected for further use. Drive shaft 26 is connected to a suitable source of power not shown. Liner material metering and distributing apparatus 23 and turret 24 are operated by means of drive shaft 26.

Referring now to FIGURE 2, there is shown the details of turret 24. Upright stationary shaft 27 is mounted in pedestal 28 which is supported by base 29. Gear 30 co-axially surrounds shaft 27 and is mounted for rotation with respect thereto by means of bearings 31. Gear 30 meshes with worm 32 which is mounted on drive shaft 26. Gear 33 co-axially surrounds shaft 27 and is secured to gear 30 by means of pins 34. Turret body 35 is secured to gears 33 and 30 by means of pins 34. Body 35 surrounds shaft 27 in rotatable relationship therewith. Bearing 36 rotatably supports the upper portion of body 35.

Body 35 has a pair of spaced, radially extending annular members 37 and 38 mounted thereon. Upper member 38 has a plurality of spaced, molding plungers 39 reciprocatingly mounted therein. Each plunger 39 has a bifurcated upper portion and a transverse shaft 40 mounted thereon. Shaft 40 supports a pair of rollers 41 and 42. Cam plate 43 is secured to shaft 27 and overlies roller 41 in contacting relationship. Cam plate 44 is secured to shaft 27 and underlies roller 42 in contacting relationship. Thus, it is apparent the reciprocating motion of plungers 39 is controlled by the cam surfaces of plates 43 and 44.

Referring now to FIGURE 3, there is shown the details of a molding plunger 39. Plunger 39 comprises a main tubular body portion 45. Body 45 has an upper bore 46 which communicates with a lower bore 47. Lower bore 47 has a smaller diameter than upper bore 46, thereby providing a shoulder 48 at the juncture thereof. Body 45 has a slot 49 which communicates with bore 46. The lower portion of body 45 has an annular flange 50 extending radially outward therefrom. Brackets 51 are secured to flange 50 through screw means 52. A spring 53 surrounds the lower portion of body 45. Flange 50 serves as an upper limit for spring 53. The lower end of body 45 has a substantially horizontal, annular surface 54 with a sealing ring-forming, annular groove 55 centrally therein.

A sleeve 56 reciprocatingly surrounds the lower portion of body 45. Sleeve 56 has an annular flange 57 extending radially outward from the upper portion thereof. Brackets 51 cooperate with flange 57 to provide a lower limit for the downward movement of sleeve 56 with respect to body 45. Spring 53 urges flange 57 into contact with the lower portions of brackets 51 to hold sleeve 53 in an extended position with respect to body 45. Sleeve 56 has a lower, inner, vertical, liner-limiting wall 58. The lower, outer portion of sleeve 56 is in the form of a lip 59.

A cylindrical punch 60 has upper cylindrical portion 61 and lower cylindrical portion 62 which are located in bores 46 and 47 respectively. Shoulder 48 cooperates with portion 61 to serve as a lower limit stop for punch 60. Punch 60 has a central cavity 63, the upper end of which is closed by plug 64. Plug 64 has a downwardly-extending, tubular portion 65. Passage 66 passes through tubular portion 65 and partially through plug 64. A conduit 67 communicates with passage 66. A conduit 68 communicates with the space between tubular portion 65 and punch 60. A punch head 69 is located at the lower end of punch 60.

A spring 70 holds punch 60 against shoulder 48. Upper movement of spring 70 is limited by a plug 71 which has an upwardly-extending rod portion 72. Cap 73 closes the upper end of bore 46 and is secured to body 45 by means of transverse pins 74. Cap 73 has an upper bifurcated portion which supports shaft 40 upon which are mounted rollers 41 and 42. Cap 73 has a central threaded bore 75 into which the rod portion 72 of plug 71 extends. The position of plug 71 is adjustable with respect to cap 73 by means of a screw 76 and associated set screw 77. It is noted however that shaft 40 and roller 41 must be removed to obtain access to screw 76. In any event, it is apparent that the effect of spring 70 on punch 60 may be varied.

In FIGURE 2 it is noted that gear 33 meshes with a gear 78. Gear 78 is secured to bushing 79 which is in turn secured to plate 80 and carrier 20. Bushing 79 is secured to shaft 81. Shaft 81 and bushing 79 are rotatably supported in pedestal 82 by means of bearing 83. Therefore, it will be seen that rotation of drive shaft 26 drives gear 30, gear 33, turret body 35, gear 78, bushing 79, plate 80 and carrier 20. The directions of rotation of carrier 20 and body 35 are shown by the arrows in FIGURE 1.

The inoperative position of plunger 39 is shown in FIGURE 2 on the right side thereof and in FIGURE 3. Plunger 39 will remain in this position until it is cammed downwardly by plate 43 into engagement with a closure 22 containing liner material 84 which is to be formed as best seen in FIGURE 3. This downward movement of plunger 39 takes place as it approaches point X as shown in FIGURE 1. The slopes of the cam surfaces on cam plates 43 and 44 are shown in FIGURE 6.

In any event, plunger 39 moves downwardly so that lip 59 of sleeve 56 will engage closure 22 near point X. Downward movement of plunger 39 causes the unformed liner material 84 in closure 22 to be somewhat deformed by punch 60, as shown in FIGURE 4, for example. Continued downward movement of body 45 and punch 60 will form and shape the liner material 84 as they move with respect to sleeve 56 until they reach the final or lowermost position as shown in FIGURE 5. It is noted at this point that the liner is completely formed. However, the respective elements must remain in the position shown in FIGURE 5 until the liner material 84 cools to a point where it will retain the liner shape imparted thereto by plunger 39. This point may occur at approximately 180° from point X. Plunger 39 is caused to rise by means of the cam surface on cam plate 44 whereby punch 60, body 45, and sleeve 56 will disengage the now-lined closure 22.

At this point it should be noted that spring 53 and 70 have been chosen so that spring 53 is stronger than spring 70. Spring 70 is chosen so that it will maintain punch 60 in its extended position against shoulder 48 during normal liner-forming, working pressures. However, should there be an excess of liner material in a given closure causing the pressure in the liner-forming area to exceed a predetermined normal limit, said excess will act on punch 60 and spring 70 whereby punch 60 will be prevented from further downward movement. Spring 70 may be somewhat compressed during this time when the excess of material resists downward movement of punch 60. If there is a large excess of the liner material in a given closure during the liner-forming operation, it may cause upward movement of punch 60 against spring 70 whereby spring 70 will be compressed. The punch will be moved upwardly a distance sufficient to accumulate said excess material in the center portion of the closure and relieve the excess pressure. In this manner, flow of excess liner material into sealing ring groove 55 and under lip 59 of sleeve 56 may be avoided since body 45 will not move upwardly and since spring 70 will be compressed to allow upward movement of punch 60 before any excess material would cause spring 53 to be compressed to allow upward movement of sleeve 56. Therefore, variation in sealing ring height and flashing of liner material over the closure periphery are avoided.

After the liner has been formed in closure 22 and all elements of plunger 39 have been withdrawn to a position whereby the bottom portion thereof will clear the upper edge of closure 22, said closure 22 will be removed from member 37 into discharge chute 25 by guide means not shown. The raised plunger 39 will continue to rotate with body 35 until it approaches point X whereat the cam plate 43 will again act on roller 41 to start downward movement of plunger 39 to initiate another liner-forming cycle.

Referring now to FIGURES 7 to 13, there is shown a modified form of molding plunger 85 having a main tubular body 86. Body 86 has an upper bore 87 and a lower bore 88 of reduced diameter. The juncture between the lower bore 88 and the upper bore 87 is defined by a shoulder 89. Body 86 has a radially extending annular wall 90 which extends from lower bore portion 88 to the upper end of a substantially vertical, liner-limiting wall 91. Wall 90 has an annular, sealing ring-forming groove 92 therein. Wall 91 extends to the lower limit of body 86. The outer, lower end portion of body 86 is formed in the shape of a lip 93.

A cylindrical punch 94 is reciprocatingly located in bore 87 and lower bore portion 88. Punch 94 includes a lower cylindrical punch head 95 which is located partially within lower bore portion 88. Punch head 95 has a lower liner-forming surface 96. Punch 94 has an intermediate, radially-extending flange 97. A spring 98 surrounds punch head 95 and resiliently supports punch 94 on shoulder 89. Punch 94 has an upper cylindrical portion 99 which has a diameter less than that of flange 97. Punch 94 has a central bore 100 extending longitudinally thereof. A plug 101 is located in and closes the upper portion of bore 100. Plug 101 has a downwardly extending tubular portion 102. Passage 103 extends through tubular portion 102 and partially through plug 101 to communicate with a fluid inlet conduit 104. The upper end of the space defined by the outer surface of tubular portion 102 and bore 100 is connected to outlet conduit 105. Body 86 has a slot 106 through which inlet conduit 104 and outlet conduit 105 extend.

Surrounding the major portion of the upper cylindrical portion 99 of punch 94 is a cylindrical sleeve 107. A spring 108 resiliently separates the lower end portion of sleeve 107 and the upper surface of annular flange 97. Sleeve 107 has a pair of upright slots 109 and 110 therein. Body 86 has a pair of similar slots 111 and 112 in the upper portion thereof which communicate with bore 87. Slot 109 is aligned with slot 111, and slot 110 is aligned with slot 112. Each of these slots has substantially the same laterial dimension. Sleeve 107 has a slot 113 through which inlet conduit 104 and outlet conduit 105 pass. A key 114 is secured to upper portion 99 of punch 94 and extends outwardly therefrom into registry with slots 109 to 112. It is apparent that key 114 prevents sleeve 107 from being removed from its position surrounding punch 94 by the action of spring 108. Thus, sleeve 107 may not move upwardly with respect to punch 94 in the position shown in FIGURE 7 due to the limiting action of key 114. However, sleeve 107 may move downwardly with respect to punch 94 against the force of spring 108. Vertically downward movement of the punch 94 is resisted by spring 98.

The upper portion of sleeve 107 is secured to a cap 115 by means of lateral pins 116. Cap 115 has an upper bifurcated portion which accommodates shaft 117 upon which roller 118 is mounted. Roller 118 is engaged by cam surface 119. Cap 115 has an annular, intermediate flange 120 which extends to the walls of bore 87 in reciprocal relationship therewith. The lower surface of annular flange 120 abuts the upper edge of sleeve 107. Cap 115 has a central threaded bore 121 into which a suitable adjustment screw 122 may be inserted. A set screw 123 may be provided to lock adjustment screw 122 in position. Member 124 surrounds the upper portion of body 86. Retainer plate 125 surrounds cap 115 and is secured to member 124 by screw means 126. The inner periphery of retainer plate 125 overlies flange 120 to prevent cap 115 and flange 120 from leaving bore 87. A plug 127 is located within the interior of sleeve 107 between the lower portion of cap 115 and the upper portion of key 114. Plug 127 has an upwardly extending rod portion 128 which extends into bore 121 in contact with adjusting screw 122. Plug 127 is held in this position by means of a spring 129. Spring 129 acts to maintain key 114 engaged with the lower ends of slots 109 and 110. However, it is apparent that key 114 which is secured to punch 94 may move upwardly against the force of spring 129 and spring 108. Spring 98 serves to hold punch 94 and sleeve 107 in their upper positions as shown in FIGURE 3. Member 124 supports shaft 130 upon which roller 131 is rotatably mounted. Roller 131 cooperates with cam surfaces 132 and 133 to vertically reciprocate plunger 85. The slopes of cam surfaces 132 and 133 are shown in FIGURE 13.

FIGURE 7 shows plunger 85 in its upright, inoperative position. When a closure 22 with unformed linear material 134 therein and plunger 85 are moved so that they overlie one another approximately at point X, cam surfaces 132 and 133 act on roller 131 to cause the entire plunger 85 to descend into engagement with the closure 22 as shown in FIGURT 11. Roller 131 acts on plunger 85 through shaft 130, member 124, body 86, through plate 125, flange 120, sleeve 107, spring 108, flange 97, and through screw 122, plug 127, spring 129, key 114, and punch 94. During the first portion of downward movement it is noted that all elements of plunger 85 move downwardly without substantial relative movement therebetween. As soon as body 86 engages closure 22 in the manner shown in FIGURE 11, further movement thereof will not take place. Thereafter, however, cam surface 119 acts upon roller 118, cap 115, sleeve 107, spring 108, flange 97, and screw 122, plug 127, spring 129, key 114, and cylindrical portion 99 to cause punch 94 to move downwardly with respect to body 86 against spring 98. During the downward movement of punch head 95, surface 96 will engage linear material 134. Further downward movement of punch 94 will compress and deform liner material 134 into the area defined by surface 96, walls 90 and 91, groove 92, and the upper surface of closure 22, as shown in FIGURE 12. FIGURE 12 shows punch 94 in its lowermost position. At this point, the liner is fully formed.

The elements will remain in the relative positions shown in FIGURE 12 for approximately 180° of rotation from point X. Thereafter, cam surface 119 will allow punch 95 to be raised with respect to body 86 in response to the action of spring 98 on flange 97. Subsequently, cam surfaces 132 and 133 will allow body 86 to be disengaged with the now-lined closure 22. The relationship of the cam surfaces 119, 132, and 133 is seen in FIGURE 13. It is noted that the punch 94 and body 86 may be arranged to disengage simultaneously. In any event, the now-lined closure 22 is withdrawn from its position beneath plunger 85, whereupon said plunger 85 will be rotated to point X in preparation for another cycle.

Springs 108 and 129 are chosen so that they will not be compressed during the normal liner-forming operation. However, should an excess of liner material 134 be present in a given closure 22, said excess will act on surface 96 of punch 94, spring 108, and spring 129 to prevent further downward movement of punch 94. If the excess of material is large enough, punch 94 may be moved upwardly against the force of springs 108 and 129. It is seen, therefore, that springs 108 and 129 serve as a pressure release mechanism for punch 94 whereby any excess liner material in a given closure will be taken up or accumulated in the center portion thereof under punch 94 rather than being accumulated in sealing ring groove 92 or extruded under the edge of lip 93 to cause a variation in sealing ring height or flashing and liner material overflow.

It is apparent that the apparatus and method of the present invention serve to form a liner on a closure in an efficient manner while at the same time avoid a defective liner due to non-uniform and improper sealing ring height or flashing and overflow by accumulating any excess liner material in the center portion of said closure.

It is to be understood that the method and apparatus of the present invention are not limited to the specific closure or apparatus shown and described herein.

Various modifications of the present invention will occur to those skilled in the art without departing from the scope thereof as defined in the claim.

I claim:

1. A method of forming a liner on a closure comprising the steps of depositing on said closure a charge of liner material, engaging the periphery of said closure with a liner limiter, compressing said liner material with a molding head passing through said liner limiter to fill a mold cavity formed by said molding head, liner limiter and closure whereby the pressure of excess liner material actuates a resilient central portion of the molding head to form an accumulating recess for any excess liner material near the central portion of said closure thereby permitting the liner material to exert a constant force against the molding head at the sealing area so that the predetermined height of the sealing ring of said liner material remains constant.

References Cited

UNITED STATES PATENTS

| | | | |
|---|---|---|---|
| 2,881,475 | 4/1959 | Wilckens | 264—268 |
| 2,924,848 | 2/1960 | Stover | 18—X |
| 2,963,728 | 12/1960 | Branoes | 18—5 |
| 3,135,019 | 6/1964 | Aichele | 18—5 |

ROBERT F. WHITE, *Primary Examiner.*

R. KUCIA, *Assistant Examiner.*